United States Patent
Watanabe

(10) Patent No.: US 9,112,194 B2
(45) Date of Patent: Aug. 18, 2015

(54) ORIGINAL FABRIC PITCH FEED MECHANISM OF ORIGINAL FABRIC MANUFACTURING DEVICE FOR ELECTROCHEMICAL ELEMENT

(75) Inventor: Shinji Watanabe, Osaka (JP)

(73) Assignee: O.M.C. CO., LTD., Osaka (JP)

( * ) Notice: Subject to any disclaimer, the term of this patent is extended or adjusted under 35 U.S.C. 154(b) by 528 days.

(21) Appl. No.: 13/510,206

(22) PCT Filed: Jan. 5, 2010

(86) PCT No.: PCT/JP2010/000027
§ 371 (c)(1),
(2), (4) Date: May 16, 2012

(87) PCT Pub. No.: WO2011/083506
PCT Pub. Date: Jul. 14, 2011

(65) Prior Publication Data
US 2012/0222819 A1   Sep. 6, 2012

(51) Int. Cl.
*H01M 4/04* (2006.01)
*H01G 11/26* (2013.01)
(Continued)

(52) U.S. Cl.
CPC ............. *H01M 4/0404* (2013.01); *H01G 11/26* (2013.01); *H01G 13/00* (2013.01);
(Continued)

(58) Field of Classification Search
CPC ........ B32B 38/18; B32B 41/00; H01G 11/26; H01G 13/00; H01G 13/02; H01M 10/052; H01M 4/04; H01M 4/0404; H01M 4/13; Y02E 60/122; Y02E 60/13
USPC .................. 156/361, 494, 495, 496, 543, 552
See application file for complete search history.

(56) References Cited

U.S. PATENT DOCUMENTS

2006/0011770 A1* 1/2006 Narabayashi ............... 242/538.2
2006/0093794 A1* 5/2006 Yukawa et al. ............... 428/180

FOREIGN PATENT DOCUMENTS

JP          10-144303         5/1998
JP          2001-236995       8/2001
(Continued)

OTHER PUBLICATIONS

Translation of JP 2002-110148, published Apr. 12, 2002.*

*Primary Examiner* — George Koch
(74) *Attorney, Agent, or Firm* — Lucas & Mercanti, LLP

(57) ABSTRACT

Provided is a pitch feed mechanism which is capable of performing an accurate, high-speed pitch feed of an original fabric having unevenness on a surface thereof in a sticking operation of an insulating tape. (1a) The original fabric pitch feed mechanism (4) that is provided on a downstream side of an insulating tape sticking process region (K) in a long original fabric (2), and performs the pitch feeding of the original fabric (2) in one direction in accordance with a boundary part (H), the original fabric pitch feed mechanism (4) being characterized by comprising (1b) a feed side roller (6a), (1c) an original fabric take-up side roller (6b), (1d) a feed side contact and separate member (7a), (1e) a take-up side contact and separate member (7b), and (1f) a pitch feed roller (8), which is disposed between the feed side roller (6a) and the original fabric take-up side roller (6b), and pulls out, when the feed side contact and separate member (7a) is separated from the feed side roller (6a), and the take-up side contact and separate member (7b) is in contact with the original fabric take-up side roller (6b) to fix the original fabric (2) with the original fabric (2) disposed therebetween, the original fabric (2) by a predetermined size from the feed side roller (6a) side by pressing the original fabric (2) that is extended between the feed side roller (6a) and the original fabric take-up side roller (6b).

4 Claims, 4 Drawing Sheets

(51) Int. Cl.
*H01G 13/00* (2013.01)
*H01G 13/02* (2006.01)
*H01M 4/13* (2010.01)
*H01M 10/052* (2010.01)

(52) U.S. Cl.
CPC ............. *H01G 13/02* (2013.01); *H01M 4/13* (2013.01); *H01M 10/052* (2013.01); *Y02E 60/122* (2013.01); *Y02E 60/13* (2013.01)

(56) References Cited

FOREIGN PATENT DOCUMENTS

| | | |
|---|---|---|
| JP | 2001-297754 | 10/2001 |
| JP | 2002-110148 | 4/2002 |
| JP | 2005-267870 | 9/2005 |
| JP | 2006-019199 | 1/2006 |
| JP | 2007-128841 | 5/2007 |

* cited by examiner

ORIGINAL FABRIC PITCH FEED MECHANISM OF ORIGINAL FABRIC MANUFACTURING DEVICE FOR ELECTROCHEMICAL ELEMENT

This is a U.S. National Phase Application under 35 U.S.C. 371 of International Application PCT/JP2010/000027, filed on Jan. 5, 2010, the entire content of which is hereby incorporated by reference.

TECHNICAL FIELD

The present invention relates to an original fabric pitch feed mechanism that can accurately pitch-feed, at a high speed, an original fabric for electrochemical elements, such as an original fabric for rolled capacitors or an original fabric for lithium batteries, on which electrodes such as positive electrodes or negative electrodes are applied at equal intervals.

BACKGROUND ART

At present, as environmental countermeasures, secondary batteries such as high-capacity lithium-ion batteries have attracted a lot of attention as power supplies for electric vehicles, power-driven engines, and electronic devices. When a lithium-ion battery is taken as an example, an electrode in which a positive electrode active material is applied to a band-shaped positive electrode current collector formed from aluminum foil is used as its positive electrode, and an electrode in which a negative electrode active material is applied to a band-shaped negative electrode current collector formed from copper foil is used as its negative electrode. A battery element produced by winding the positive electrode current collector and the negative electrode current collector via a separator into a cylinder shape is stored into a cylindrical battery can, or a battery element obtained by winding the positive electrode current collector and the negative electrode current collector via a separator into a bobbin shape is formed into a flat shape and stored into a square-shaped battery can or bag. An electrolyte is injected thereinto and the can or bag is closed to produce a lithium-ion battery.

Electrode applied portions that are to be electrodes such as the positive and negative electrodes are formed on a long and wide original fabric into rectangular shapes at equal intervals by screen printing. Thus, when the original fabric is removed from the screen, spiny small projections occur on boundary portions of the viscous applied portions. When the electrode applied portions are solidified to form electrodes and then the original fabric is slit with a predetermined width dimension to form narrow band-shaped current collectors and they are wound via a separator as described above, the spiny projections are broken and remain as foreign matter, or the spiny projections that are not broken break through the separator to cause short circuit between the positive and negative electrodes. Thus, the temperature of the battery abnormally increases, and fire infrequently occurs in terrible cases.

Thus, in order to prevent such short circuit between electrodes, an insulating film is attached so as to cover the overall width of the boundary portion between an electrode and a non-applied portion. In such a case, in order to accurately attach the insulating film to the boundary portion in a tensioned manner, it is necessary to accurately pitch-feed the original fabric. In a conventional original fabric pitch feed mechanism, the original fabric is sandwiched between nip rollers from above and below, and the nip rollers are rotated by a predetermined angle to pitch-feed the original fabric. However, the portions of electrodes that are formed on the front and back of the original fabric are thick as compared to electrode non-formed portions, and due to the steps, slippage occurs at the electrode non-formed portions. Thus, accurate pitch feed cannot be performed, and the feed speed is not sufficient.

Such a problem is also seen in a battery manufacturing site, and, for example, countermeasure using an elevating roller as disclosed in Patent Literature 1 is also proposed as one of solutions to the problem. However, when an electrode sheet is fed solely with the elevating roller, high-speed rough feed and subsequent low-speed accurate feed have to be combined since the electrode sheet is not assuredly fixed. Thus, a transfer method is complicated, and the efficiency is poor in terms of work efficiency since the two types of feeds have to be combined.

CITATION LIST

Patent Literature

[PTL 1] Japanese Laid-Open Patent Publication No. 2002.110148

DISCLOSURE OF THE INVENTION

Problems to be Solved by the Invention

An object of the present invention is to develop a pitch feed mechanism that can accurately pitch-feed an original fabric having an uneven surface at a high speed in an insulating tape tension-attachment operation.

Solution to the Problems

The invention can be described as an original fabric pitch feed mechanism (4) of an original fabric manufacturing device (60) for electrochemical elements, the original fabric pitch feed mechanism (4) being provided on a downstream side of an insulating tape tension-attachment process region (K) on a long original fabric (2) that has electrodes (3) formed on at least one surface thereof at predetermined intervals and in which an insulating tape (1) is to be attached in a tensioned state to boundary portions (H) between the electrodes (3) and electrode (3) non-formed portions (3a), the original fabric pitch feed mechanism pitch-feeding the original fabric (2) in one direction in accordance with the boundary portions (H), the original fabric pitch feed mechanism (4) including:

a feed side roller (6a) which is provided on an original fabric (2) feed side and feeds the original fabric (2) toward a take-up side while placing the original fabric (2) thereon;

an original fabric take-up side roller (6b) which is provided on the original fabric (2) take-up side and receives the original fabric (2) while placing the original fabric (2) thereon;

a feed side contacting/separating member (7a) which comes into contact with and moves away from the feed side roller (6a) and presses the original fabric (2) against the feed side roller (6a) during contact;

a take-up side contacting/separating member (7b) which operates in a manner opposite to that of the feed side contacting/separating member (7a) to come into contact with and move away from the original fabric take-up side roller (6b) and presses the original fabric (2) against the original fabric take-up side roller (6b) during contact; and a pitch feed roller (8) which is disposed between the feed side roller (6a) and the original fabric take-up side roller (6b) and presses the original fabric (2) provided in a tensioned state between the feed side roller (6a) and the original fabric take-up side roller (6b), to draw the original fabric (2) from the feed side roller (6a) side by a predetermined dimension when the feed side contacting/separating member (7a) moves away from the feed side roller (6a) and the take-up side contacting/separating member (7b) comes into contact with the original fabric take-up side roller (6b) to fix the original fabric (2) in a sandwiching manner.

The invention can further be described as having, a one-way clutch (6c) which rotates only in a transfer direction is installed on a bearing rotation portion of the original fabric take-up side roller (6b). The invention can also be described as having a control section (9) is further provided which detects a position where the original fabric (2) is fed by the pitch feed roller (8) (a boundary portion (H) in an embodiment) and which controls a movement amount of the pitch feed roller (8) on the basis of a result of the detection to control a feed amount.

Advantageous Effects of the Invention

In the present invention, in order to draw the original fabric (2) by a predetermined length, the take-up side contacting/separating member (7b) presses against the original fabric take-up side roller (6b) to sandwich and fix the original fabric (2) therebetween, and in a state where the feed side contacting/separating member (7a) is moved away from the feed side roller (6a), the pitch feed roller (8) presses against the original fabric (2) to draw the original fabric (2) only from the feed side roller (6a) side. Thus, a feed amount of the original fabric (2) that is forcedly drawn from the upstream side by moving the pitch feed roller (8) is uniquely determined by a movement amount of one movement of the pitch feed roller (8) even when the original fabric (2) has an uneven surface.

In such a case, when the one-way clutch (6c) which rotates only in the transfer direction is installed on the bearing rotation portion of the original fabric take-up side roller (6b), reverse rotation of the original fabric take-up side roller (6b) due to movement of the pitch feed roller (8) to press the original fabric (2) can completely be prevented. Thus, due to a combination of the prevention and a fixing force of the take-up side contacting/separating member (7b) that presses against the original fabric take-up side roller (6b) to hold the original fabric (2) therebetween, the original fabric (2) is not at all drawn from the original fabric take-up side roller (6b) side, and high-speed pitch feed is also enabled.

Further, when the control section (9) is provided which detects a position where the original fabric (2) is fed by the pitch feed roller (8) and which controls a movement amount of the pitch feed roller (8) on the basis of a result of the detection to control a feed amount, pitch feed is enabled while fine correction is performed for each pitch feed, and the long original fabric (2) can be drawn in an accurate feed amount at a high speed throughout the original fabric (2). Thus, the insulating tape (1) can be attached to an appropriate location at high work efficiency.

DESCRIPTION OF EMBODIMENTS

Figure 1:
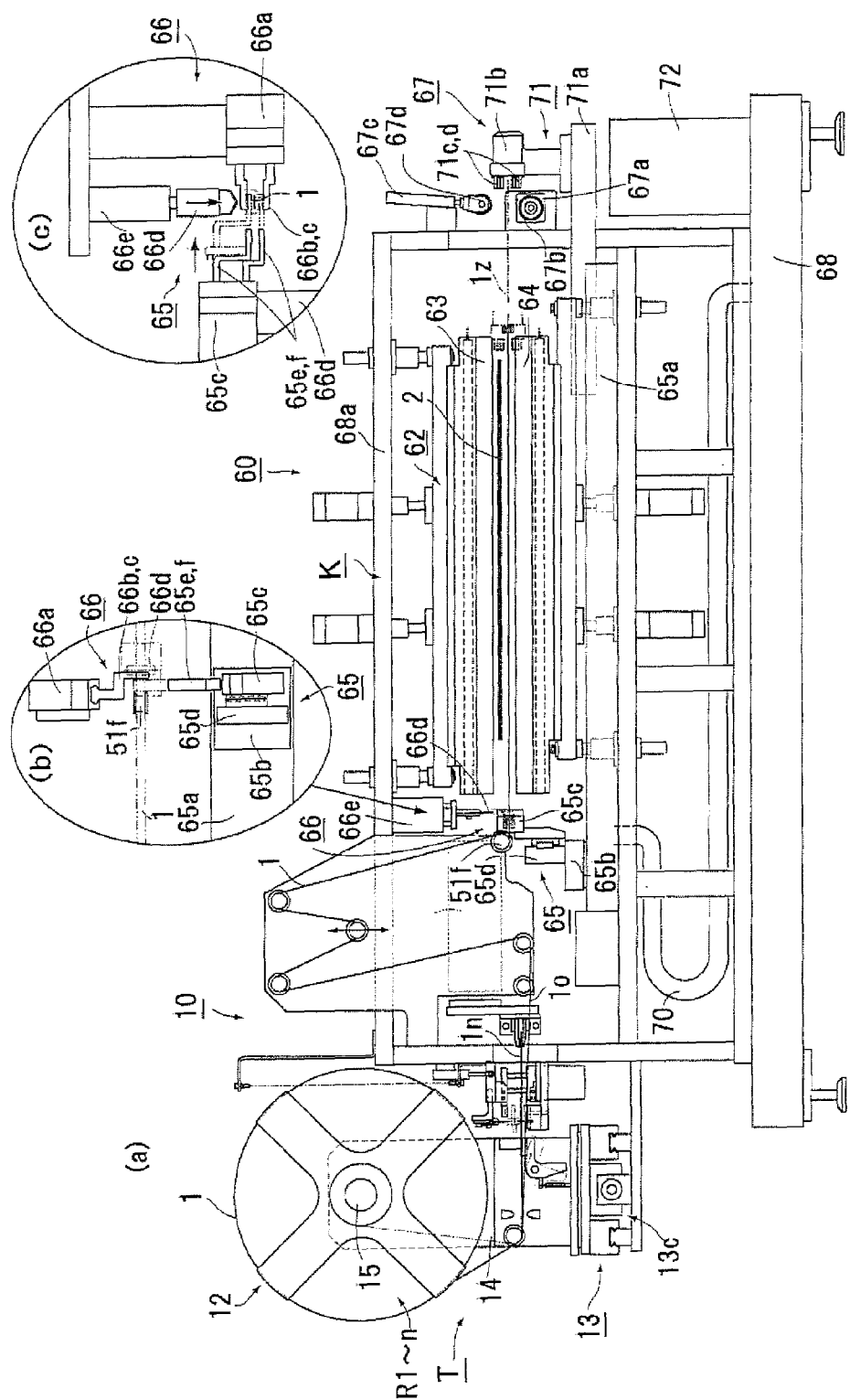
FIG. 1 is a front view of an original fabric manufacturing device equipped with an automatic feeder for an insulating tape for electrochemical elements according to the present invention, a partial plan view of its extending mechanism section, and a right-side view of the section.
Figure 2:
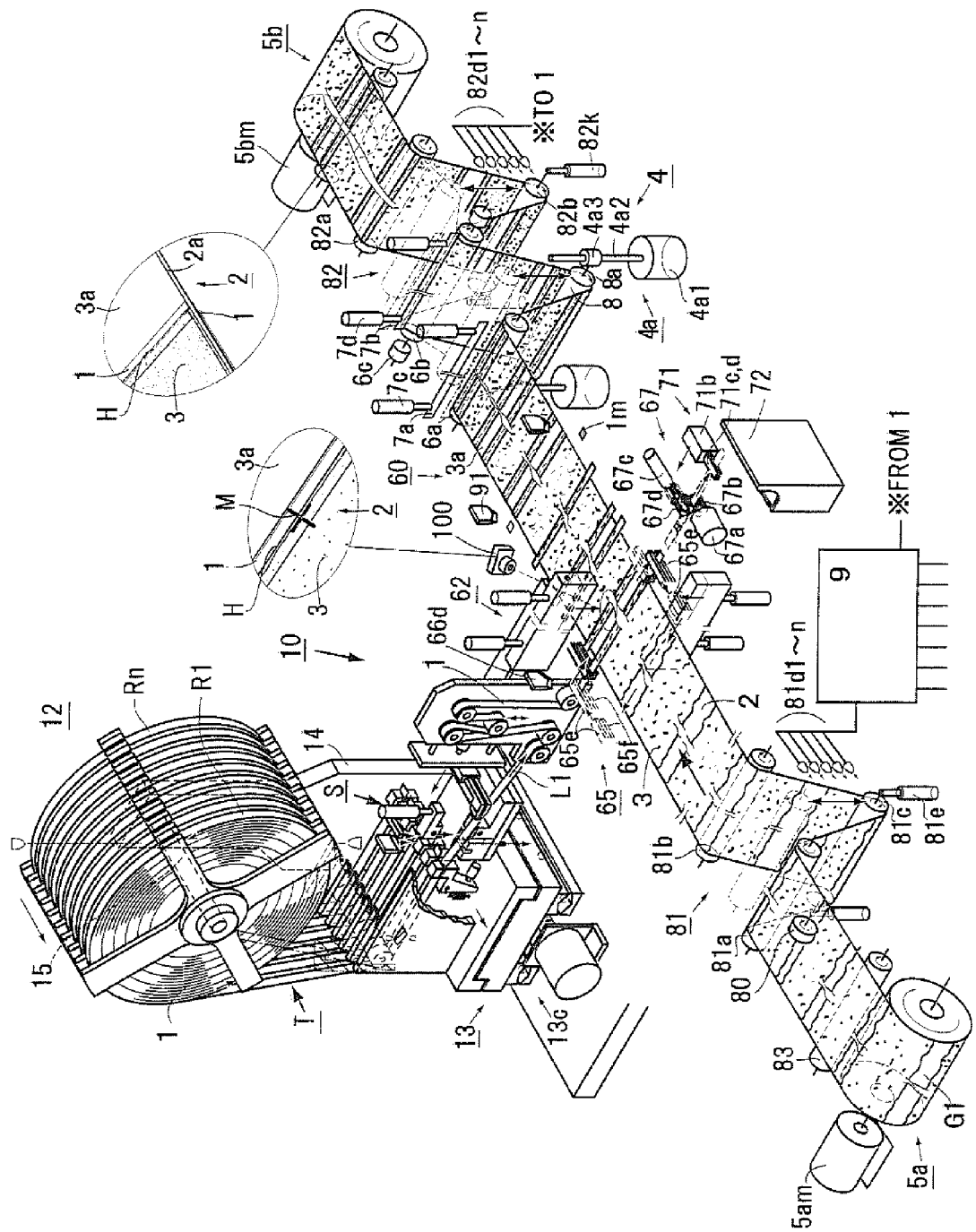
FIG. 2 is a perspective view of a principal portion of FIG. 1.

The following will describe one embodiment of the present invention based on the drawings. An original fabric manufacturing device (60) is a device that pitch-feeds an original fabric (2) at predetermined intervals and accurately attaches an insulating tape (1) for electrochemical elements to boundary portions (H) between electrodes (3) provided on the original fabric (2) and electrode non-formed portions (3a). The original fabric manufacturing device (60) generally includes an original fabric feed section (5a), an original fabric take-up section (5b), an original fabric pitch feed mechanism (4), a compression-bonding mechanism section (62) for the insulating tape (1), an automatic feeder (10) for the insulating tape (1), and a control section (9).

In the original fabric (2) used in the present invention, in the case of a positive electrode, a positive electrode coating material, which is prepared by dispersing and mixing a lithium-transition metal composite oxide such as $Li_xCoO_2$, $Li_xNiO_2$, $Li_xMn_2O_4$, $Li_xMnO_3$, or $Li_xNi_yCo(1-y)O_2$ with a conductive material such as carbon black, a binding agent such as polyvinylidene difluoride (PVDF), and a solvent such as N-methyl-2-pyrrolidone (NMP), is applied to band-shaped aluminum foil that is a current collector. The coating material is applied to one surface and dried, and then is similarly applied to the opposite surface and dried, whereby the electrodes (3) are applied and formed on both surfaces in rectangular shapes across the overall width of the original fabric (2) at predetermined intervals. Thus, formed portions and non-formed portions of the electrodes (3) alternately appear. Spiny projections as described in the conventional example are formed on the boundary portions (H) between the electrodes (3) and the non-formed portions (3a).

In the case of a negative electrode, a negative electrode coating material, which is prepared by dispersing and mixing pyrolytic carbons that can dope and undone lithium, cokes such as pitch coke, needle coke, and petroleum coke, graphites, glassy carbons, an organic high-molecular-weight compound firing body obtained by firing phenolic resin, furan resin, or the like, a carbonaceous material such as carbon fiber and activated carbon, and a conductive high-molecular-weight material such as polyacetylene and polypyrrole with a conductive material such as carbon black, a binding agent such as polyvinylidene difluoride (PVDF), and a solvent such as N-methyl-2-pyrrolidone (NMP), is applied to surfaces of copper foil or the like of a current collector. In this case as well, the coating material is applied to one surface and dried, and then is similarly applied to the opposite surface and dried, whereby the electrodes (3) are applied and formed on both surfaces in rectangular shapes across the overall width of the original fabric (2) at predetermined intervals, and formed portions and non-formed portions of the electrodes (3) alternately appear. In this case as well, spiny projections as described in the conventional example are formed on the boundary portions (H).

Since the electrodes (3) are normally formed on both front and back surfaces of a current collector sheet (2a) constituting the original fabric (2), at least one automatic feeder (10) is installed to the original fabric manufacturing device (60) on each of the front surface side and the back surface side.

The original fabric feed section (5a) of the original fabric manufacturing device (60) is a section that retains an original fabric roll (G1) obtained by winding the original fabric (2) having the electrodes (3) formed at predetermined intervals on at least one surface of the current collector sheet (2a), into a roll shape and that feeds the original fabric (2) in response to tension applied from the downstream side to supply the original fabric (2). The original fabric feed section (5a) is installed in a most upstream position in the original fabric manufacturing device (60). The feed of the original fabric (2) is performed by a feed servomotor (5am) such that the tension of the original fabric (2) that is fed by cooperation with a later-described device is always constant.

The original fabric take-up section (5b) on a side opposite to the original fabric feed section (5a) is a section that takes up the original fabric (2) having the insulating tape (1) attached to the boundary portions (H) as tension-attachment portions in a tensioned state, into a roll shape. The original fabric take-up section (5b) is installed in a most downstream position in the original fabric manufacturing device (60). The take-up is performed by a take-up servomotor (5bm) such that the tension of the original fabric (2) that is fed by cooperation with the later-described device is always constant.

In the original fabric manufacturing device (60), a feed circumferential speed management unit (80), an upstream side tension unit (81), the original fabric pitch feed mechanism (4), and a downstream side tension unit (82) are provided in order from the original fabric feed section (5a) toward the downstream. A region between the upstream side tension unit (81) and the original fabric pitch feed mechanism (4) is an insulating tape tension-attachment process region (K), and the automatic feeder (10) is installed in this portion.

The feed circumferential speed management unit (80) is installed between a feed roller (83) of the original fabric feed section (5a) and an upstream side first fixed roller (81a) of the upstream side tension unit (81). A rotating wheel (80a) between the feed roller (83) and the upstream side first fixed roller (81a) rotates in contact with the original fabric (2) that is being fed in a tensioned state with tension applied thereto, and the feed circumferential speed management unit (80) detects a feed speed of the original fabric (2) and controls the rotation speed of the feed servomotor (5am) such that the feed speed is constant.

The upstream side tension unit (81) includes the upstream side first fixed roller (81a), an upstream side second fixed roller (81b) provided on the downstream side of the upstream side first fixed roller (81a), and an upstream side tension roller (81c) which is disposed between the rollers (81a) and (81b) and is in contact with the original fabric (2), which is provided in a tensioned state between the rollers (81a) and (81b), so as to press the original fabric (2). During a series of operations in the device (60), the upstream side tension roller (81c) is pneumatically controlled by a cylinder (81e) such that the tension of the original fabric (2) that is supplied to the next process is kept constant. A speed of moving the original fabric (2) up and down by the upstream side tension roller (81c) is sensed by a plurality of upstream side speed control sensors (81dl) to (81dn) that are installed at equal intervals along the moving direction of the upstream side tension roller (81c).

In the insulating tape tension-attachment process region (K) subsequent to the upstream side tension unit (81), the compression-bonding mechanism section (62) for the insulating tape (1) is provided as described above, and the automatic feeder (10) for the insulating tape (1) is connected to the compression-bonding mechanism section (62). The automatic feeder (10) includes: a tape supply section (T) for the insulating tape (1), which includes a reel (12) which aligns and retains a plurality of rolls (R1) to (Rn) each formed by winding the insulating tape (1), a reel support shaft (15) which is extended such that the reel (12) can be inserted thereinto or removed therefrom, a reel retaining plate (14) which retains the reel support shaft (15), a pitch movement base mechanism section (13) on which the reel retaining plate (14) is mounted, a servomechanism (13c) which pitch-moves the pitch movement base mechanism section (13) along a reel support shaft direction; and a tape connection mechanism section (S) that continuously supplies, to the compression-bonding mechanism section (62), the insulating tape (1) supplied from the tape supply section (T), and connects old and new insulating tapes (1o) and (1n) when switching from an old roll to a new roll.

An extending mechanism section (65) of the compression-bonding mechanism section (62) is provided on a stand (68) and includes: a travelling mechanism section (65a) which is provided along a transfer line (L1) of the insulating tape (1) and utilizes, for example, a servomechanism; a travelling mechanism section block (65b) which is provided in the travelling mechanism section (65a) and reciprocates along the transfer line (L1); a claw cylinder drive section (65d) which is mounted on the travelling mechanism section block (65b) and reciprocates an extending claw working cylinder (65c) in a direction perpendicular to a travelling direction; and the extending claw working cylinder (65c) which is mounted on the claw cylinder drive section (65d), in which extending claws (65e) and (65f) are installed, and which opens and closes the extending claws (65e) and (65f) in the vertical direction. A power supply line for the travelling mechanism section (65a), which is reciprocated by the servomechanism, the extending claw working cylinder (65c), and air supply pipes for the extending claw working cylinder (65c) are mounted on the travelling mechanism section block (65b) and are mounted, for example, on a universal chain (70) whose bent portion is movable.

A tape retaining mechanism section (66) is mounted on an upper frame (68a) of the stand (68) and is a claw opening/closing device such as an opening/closing cylinder (66a) provided with fixed claws (66b) and (66c) which open and close in the vertical direction, and they are provided on the downstream side of and in proximity to an exit roller (51f), which is provided at the final stage of the tape connection mechanism section (S), so as to sandwich the insulating tape (1) therebetween from above and below. The extending claws (65e) and (65f) that have advanced enter between the exit roller (51f) and the fixed claws (66b) and (66c). In addition, a second cutting blade (66d), having a spear-like pointed end, for cutting the insulating tape (1) is disposed on the downstream side of and in proximity to the fixed claws (66b) and (66c) such that the second cutting blade (66d) is movable up and down by a second cutting cylinder (66e).

A discarding mechanism section (67) is intended to discard a discarded tape portion (1z) of the insulating tape (1) at an initial stage which tape portion (1z) is extended by the extending mechanism section (65) and has at least a joint. The discarding mechanism section (67) is provided at an end potion of the transfer line (L1) of the insulating tape (1), namely, at the right end in FIG. 1, and is provided directly below the transfer line (L1). The discarding mechanism section (67) includes a tape discharge roller (67b) which is driven by a discharge motor (67a), a driven roller (67d) which comes into contact with and moves away from the discharge roller (67b) from an oblique direction by an oblique movement cylinder (67c) disposed obliquely downwardly with respect to the discharge roller (67b), and a discarded tape feed movement section (71) which opens and closes in the vertical direction to sandwich and draw the discarded tape portion (1z) of the insulating tape (1).

The discarded tape feed movement section (71) includes: a reciprocating mechanism section (71a) which reciprocates along the transfer line (L1) of the insulating tape (1) and utilizes, for example, a servomechanism; and a discarding claw drive cylinder (71b) which is mounted on the reciprocating mechanism section (71a) and has discarding claws (7k) and (71d) which open and close in the vertical direction for sandwiching the discarded tape portion (1z) therebetween. A storage dust box (72) for the discarded tape portion (1z) is provided below the tape discharge roller (67b).

Third cutting blades (91) for cutting protruding ends (1m) of the insulating tape (1), which protrude from both edges of the original fabric (2), at both edges of the original fabric (2) are provided on the downstream side of the compression-bonding mechanism section (62).

The pitch feed mechanism (4) is provided on the original fabric (2) feed side and includes: a feed side roller (6a) which feeds the original fabric (2) toward the take-up side while contacting the original fabric (2) at a certain angle, namely, placing the original fabric (2) thereon; an original fabric take-up side roller (6b) which is provided on the original fabric (2) take-up side and receives the original fabric (2) while contacting the original fabric (2) at a certain angle; a feed side contacting/separating member (7a) which comes into contact with and moves away from the feed side roller (6a) and presses the original fabric (2) against the feed side roller (6a) during contact; a take-up side contacting/separating member (7b) which operates in a manner opposite to that of the feed side contacting/separating member (7a) to come into contact with and move away from the original fabric take-up side roller (6b) and presses the original fabric (2) against the original fabric take-up side roller (6b) during contact; and a pitch feed roller (8) which is disposed between the feed side roller (6a) and the original fabric take-up side roller (6b) and presses the original fabric (2) provided in a tensioned state between the feed side roller (6a) and the original fabric take-up side roller (6b), to draw the original fabric (2) from the feed side roller (6a) side by a predetermined dimension when the feed side contacting/separating member (7a) moves away from the feed side roller (6a) and the take-up side contacting/separating member (7b) comes into contact with the original fabric take-up side roller (6b) to fix the original fabric (2) in a sandwiching manner.

The feed side contacting/separating member (7a) and the take-up side contacting/separating member (7b) are moved up and down by pneumatic cylinders (7c) and (7d) to perform the above contacting/separating operations. A rotary shaft (8a) of the pitch feed roller (8) is mounted on servo drive screw mechanisms (4a) each provided in the vertical direction, and the pitch feed roller (8) is movable up and down. In addition, according to need, a one-way clutch (6c) is employed on a bearing portion of the rotary shaft (8a) of the original fabric take-up side roller (6b) in order to prevent the original fabric take-up side roller (6b) on the downstream side from rotating in the opposite direction due to downward movement of the pitch feed roller (8) during an operation of feeding the original fabric (2) from the feed side roller (6a) on the upstream side, whereby there is no influence of tension caused by the downward movement of the pitch feed roller (8) during the operation of feeding the original fabric (2). In other words, in order to prevent the original fabric take-up side roller (6b) on the downstream side from rotating due to the tension to draw the original fabric (2) back to the upstream side, reverse rotation of the rotary shaft is prevented.

The servo drive screw mechanisms (4a) for the pitch feed roller (8) each have a known structure, namely, a structure in which a drive screw (4a2) connected to a servo motor (4a1) rotates in a forward or reverse direction by the servo motor (4a1) and a nut member (4a3) screwed on the drive screw (4a2) moves up or down along the drive screw (4a2). Both ends of the rotary shaft (8a) of the pitch feed roller (8) are attached to the nut members (4a3), respectively. The pitch feed roller (8) moves up and down with upward and downward movement of the nut members (4a3).

The downstream side tension unit (82) is provided on the downstream side of and adjacently to the aforementioned pitch feed mechanism (4) and includes: a downstream side fixed take-up roller (82a) which is provided on the downstream side of the original fabric take-up side roller (6b); and a downstream side tension roller (82b) which is disposed between the fixed take-up roller (82a) and the original fabric take-up side roller (6b) so as to be movable up and down and is in contact with the original fabric (2) provided in a tensioned state between both rollers (6b) and (82a) so as to press the original fabric (2). The downstream side tension unit (82) is movable up and down by a pneumatic cylinder (82k). During a series of operations in the device (60), the downstream side tension roller (82b) is controlled such that the original fabric (2) is taken up by the original fabric take-up section (5b) while the tension of the original fabric (2) is kept constant. An upward movement speed of the downstream side tension roller (82b) is sensed by a plurality of downstream side speed control sensors (82d1) to (82dn) that are installed at equal intervals along the moving direction of the downstream side tension roller (82b), whereby a take-up speed of the original fabric (2) is controlled.

Figure 3:
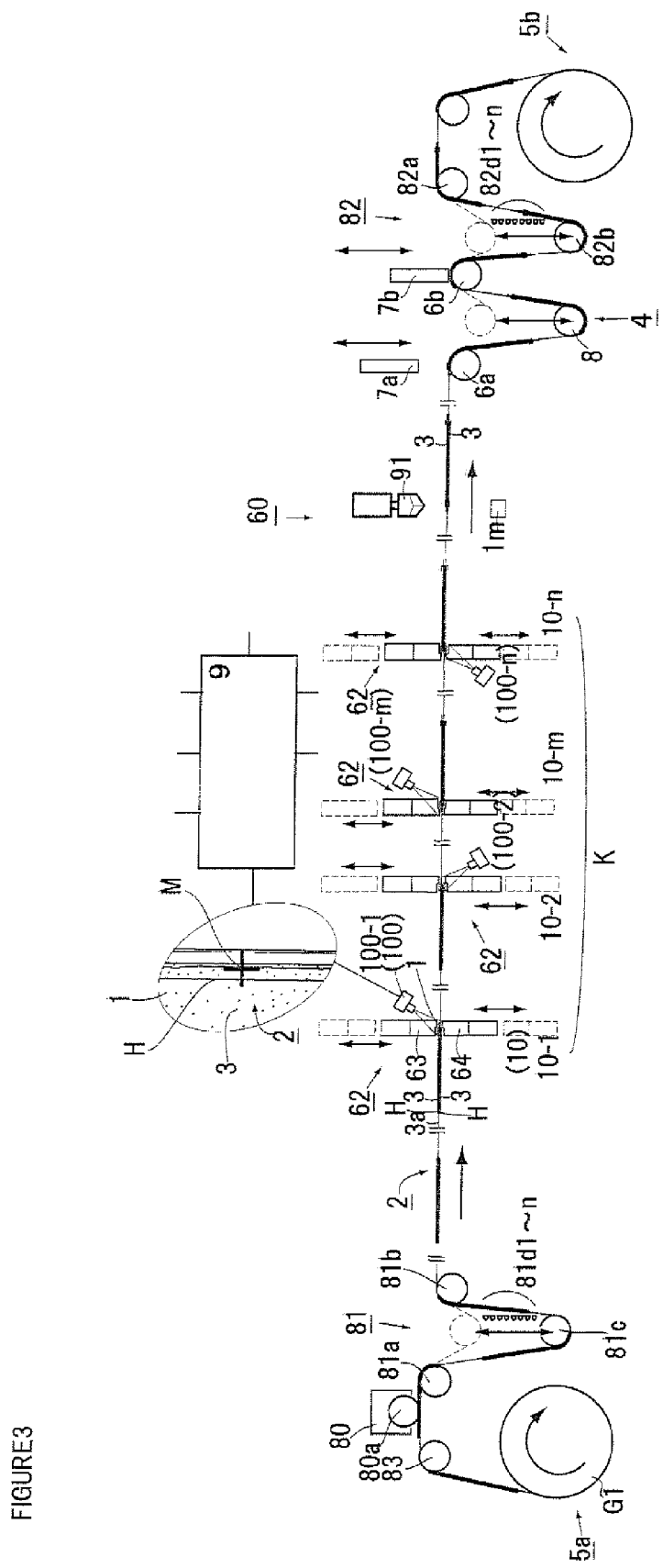
FIG. 3 is a diagram schematically illustrating a pitch feed mechanism of the present invention.

Next, an operation of the device (60) will be described. In a steady operation state, the original fabric (2) is drawn from the original fabric roll (G1) in the original fabric feed section (5a), is passed through a predetermined path shown in FIG. 3, and is wound by the original fabric take-up section (5b). In this state, the boundary portion (H) of the electrode (3) on the original fabric (2) is caused to coincide with a reference mark (M) for an initial camera (100-1), and the operation is started. At that time, it is in a state where, while the feed side contacting/separating member (7a) moves away from the feed side roller (6a) to release the original fabric (2), the take-up side contacting/separating member (7b) presses against the original fabric take-up side roller (6b) to fix the original fabric (2). In addition, on the feed side roller (6a) side, it is in a state where constant tension is applied to the original fabric (2). The pitch feed roller (8) is located at an upper position indicated by a dotted line in FIG. 3. From the position, the pitch feed roller (8) is slightly moved up and down, and the boundary portion (H) of the electrode (3) on the original fabric (2) is caused to coincide with the reference mark (M) for the aforementioned initial camera (100-1) by image processing (e.g., a processing method in which a tension-attachment digital image of the insulating tape (1) that is taken with a camera (100) and set as a reference is previously stored in the control section (9), an insulating tape (1) attached newly in a tensioned state is taken with the camera (100), the reference tension-attachment digital image and the newly-taken tension-attachment digital image are compared to each other, it is determined as a non-defective product if the newly attached insulating tape (1) is attached within a set reference range, it is determined as a defective product if the newly attached insulating tape (1) is attached outside the set reference range, and the result of the determination is recorded and notified to an operator) to perform position adjustment. Such fine adjustment can easily be performed since the drive source is the servo motor (4a1). When the fine adjustment is completed, the operation is started, and the feed side contacting/separating member (7a) presses against the feed side roller (6a) to fix the original fabric (2).

Figure 4:
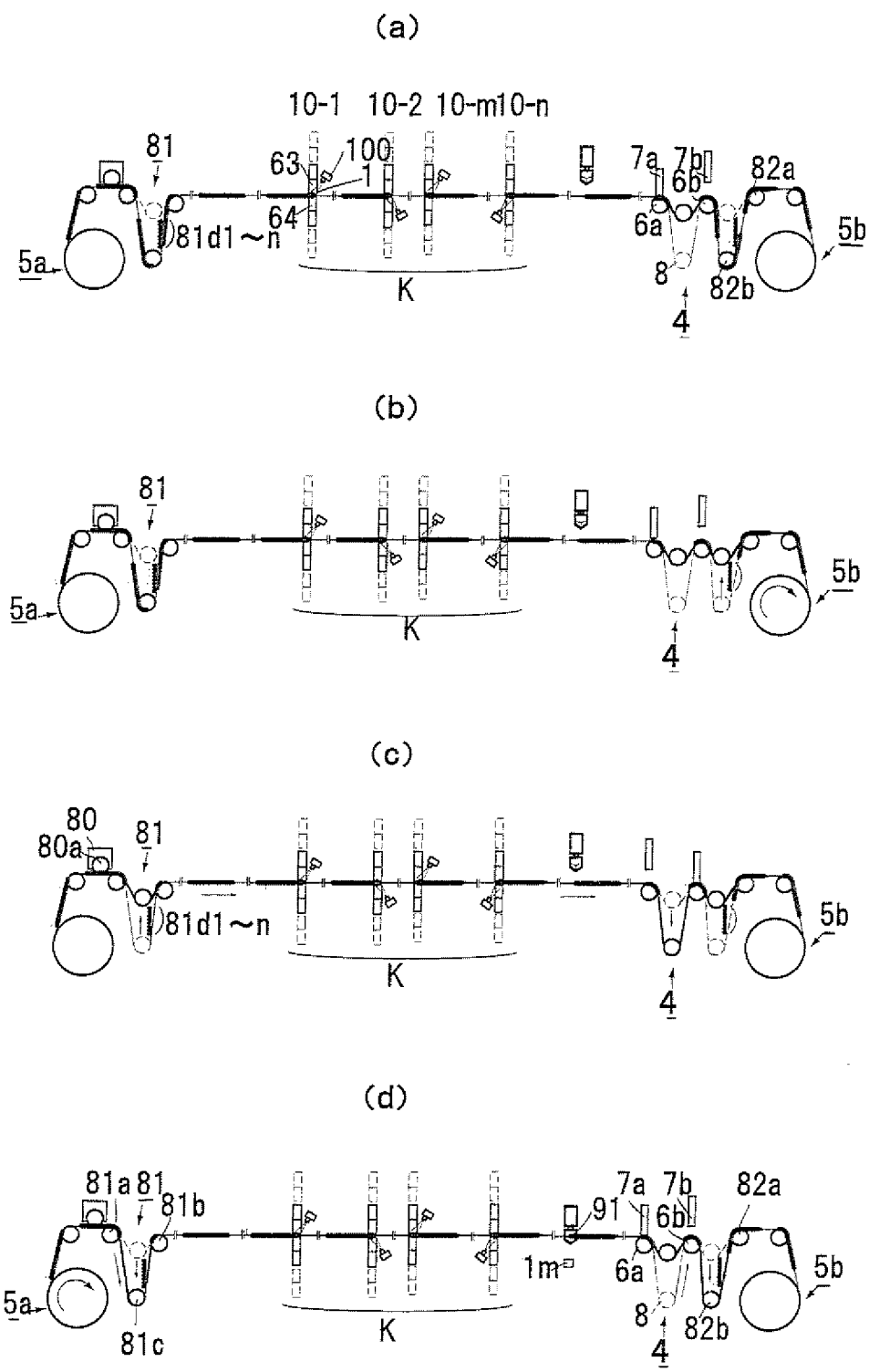
FIG. 4 is a diagram showing a procedure of pitch feed of the present invention.

In this state, a first automatic feeder (10-1) for the insulating tape (1) is actuated, the boundary portion (H) between the electrode (3) and the non-formed portion (3a) is tensioned across the overall width of the original fabric (2), and the insulating tape (1) is bonded to the portion (H) with compression-bonding blocks (63) and (64) of the compression-bonding mechanism section (62) (a bonding method includes various methods such as a case with an adhesive and a case by means of thermocompression bonding, and thermocompression bonding will be described as a representative example in the present specification). When the thermocompression bonding ends, the insulating tape (1) is cut by the second cutting blade (66d) that has been waiting on the entry side with respect to the original fabric (2), and thus the insulating tape (1) that is thermocompression-bonded to the original fabric (2) is separated from the end of the insulating tape (1) on the automatic feeder (10) side, resulting in a state where it is possible to pitch-feed the original fabric (2) (FIG. 4(a)).

Then, as described above, while the feed side contacting/separating member (7a) moves clown to come into a state of pressing against the feed side roller (6a) to fix the original fabric (2) to the feed side roller (6a), the take-up side contacting/separating member (7b) moves away from the original fabric take-up side roller (6b) to release the original fabric (2), and take-up is performed by the original fabric take-up section (5b). During the original fabric take-up, constant tension is applied to the original fabric (2) from the original fabric take-up side roller (6b) to the original fabric take-up section (5b) by a pressure-adjusting operation of the cylinder (82k), an upward movement speed of the downstream side tension roller (82b) is detected as a speed of ON/OFF switching, at upward movement, of the downstream side speed control sensors (82dl) to (82dn) located at a lower limit position, and the take-up speed of the take-up servomotor (5bm) is controlled such that the upward movement speed becomes a predetermined speed (FIG. 4(b)).

Then, when the take-up ends, it again becomes a state where, while the feed side contacting/separating member (7a) moves away from the feed side roller (6a) to release the original fabric (2), the take-up side contacting/separating member (7b) presses against the original fabric take-up side roller (6b) to fix the original fabric (2). Then, the pitch feed roller (8) that has stopped at the upward position moves down to draw the original fabric (2) from the feed side roller (6a) side by 1 pitch. Then, in response to this, the upstream side tension roller (81c) of the upstream side tension unit (81) is lifted by the tension, and the original fabric (2) from the upstream side tension roller (81c) to the pitch feed roller (8) advances by the 1 pitch. During this period, constant tension is continuously applied to the original fabric (2) of the above section by the upstream side tension roller (81c), and at the same time, a downward movement speed of the pitch feed roller (8) is controlled by the servo drive screw mechanism (4a) by means of sensing of the upstream side speed control sensors (81dl) to (81dn) to control the feed speed of the original fabric (2). After the 1-pitch feed of the original fabric (2) is performed, the boundary portion (H) of the electrode (3) on the back surface side of the original fabric (2) is caused to coincide with a reference mark (M) for a camera (100-2) of a second automatic feeder (10-2) by image processing as described above, similarly to the first automatic feeder (10-1). Thereafter, the feed side contacting/separating member (7a) presses against the feed side roller (6a) to fix the original fabric (2). Then, the boundary portion (H) between the electrode (3) and the non-formed portion (3a) is tensioned across the overall width of the original fabric (2), and the insulating tape (1) is thermocompression-bonded to the portion (H) with the compression-bonding blocks (63) and (64) of the compression-bonding mechanism section (62) (FIG. 4(c)).

When the thermocompression bonding ends, the feed servomotor (5am) is actuated to feed the original fabric (2), and, because of this, the upstream side tension roller (81c) that has been waiting at an upward position starts moving down due to an operation of an pneumatic cylinder (8e), to feed the original fabric (2) from the original fabric feed section (5a) by 1 pitch. During the feed, constant tension is continuously applied by the upstream side tension roller (8c), and at the same time, the feed circumferential speed management unit (80) measures a feed speed of the original fabric (2), and the rotation of the feed servomotor (5am) is controlled such that the original fabric (2) is fed at a constant feed speed (FIG. 4(d)). In addition, when the pitch feed of the original fabric (2) ends, protruding ends (1m) of the insulating tape (1) which protrude from both edges of the original fabric (2) are cut and removed. Such operations are repeated to take up the original fabric (2) to which the insulating tapes (1) are attached.

DESCRIPTION OF THE REFERENCE CHARACTERS (H) boundary portion
(K) insulating tape tension-attachment process region
(1) insulating tape
(2) original fabric
(3) electrode
(3a) non-formed portion
(4) original fabric pitch feed mechanism
(6a) feed side roller
(6b) original fabric take-up side roller
(7a) feed side contacting/separating member
(7b) take-up side contacting/separating member
(8) drawing pitch feed roller
(9) control section
(60) original fabric manufacturing device

What is claimed is:

1. An original fabric pitch feed mechanism of an original fabric manufacturing device for electrochemical elements, the original fabric pitch feed mechanism being provided on a downstream side of an insulating tape tension-attachment process region on a long original fabric that has electrodes formed on at least one surface thereof at predetermined intervals and in which an insulating tape is to be attached in a tensioned state to boundary portions between the electrodes and electrode non-formed portions, the original fabric pitch feed mechanism pitch-feeding the original fabric in one direction in accordance with the boundary portions, the original fabric pitch feed mechanism comprising:

a feed side roller which is provided on an original fabric feed side and feeds the original fabric toward a take-up side while placing the original fabric thereon;

an original fabric take-up side roller which is provided on the original fabric take-up side and receives the original fabric while placing the original fabric thereon;

a feed side contacting/separating member which is adapted to move into contact with the feed side roller and presses the original fabric against the feed side roller when the original fabric is drawn from the original fabric take-up side of the feed side roller and move away from the feed side roller when the original fabric is fed to the feed side of the feed side roller;

a take-up side contacting/separating member which is adapted to move into contact with the original fabric take-up side roller and presses the original fabric against the original fabric take-up side roller when the original fabric is fed to the feed side of the feed side roller and move away from the original fabric take-up side roller when the original fabric is drawn from the original fabric take up side of the original fabric take-up side roller; and a pitch feed roller which is disposed between the feed side roller and the original fabric take-up side roller and is adapted to move into and out of tension contact with the original fabric, and contacts the original fabric between the feed side roller and the original fabric take-up side roller, to draw the original fabric from the feed side of the feed side roller by a predetermined dimension when the feed side contacting/separating member moves away from the feed side roller and the take-up side contacting/separating member comes into contact with the original fabric take-up side roller to fix the original fabric in a sandwiching manner.

2. The original fabric pitch feed mechanism of the original fabric manufacturing device for electrochemical elements according to claim 1, wherein a one-way clutch which rotates only in a transfer direction is installed on a bearing rotation portion of the original fabric take-up side roller.

3. The original fabric pitch feed mechanism of the original fabric manufacturing device for electrochemical elements according to claim 1, further comprising a control section which detects a position where the original fabric is fed by the pitch feed roller and which controls a movement amount of the pitch feed roller on the basis of a result of the detection to control a feed amount.

4. The original fabric pitch feed mechanism of the original fabric manufacturing device for electrochemical elements according to claim 2, further comprising a control section which detects a position where the original fabric is fed by the pitch feed roller and which controls a movement amount of the pitch feed roller on the basis of a result of the detection to control a feed amount.

* * * * *